Feb. 28, 1950　　　W. A. HYLAND　　　2,498,887
CULTIVATOR
Filed Aug. 23, 1944　　　2 Sheets-Sheet 1
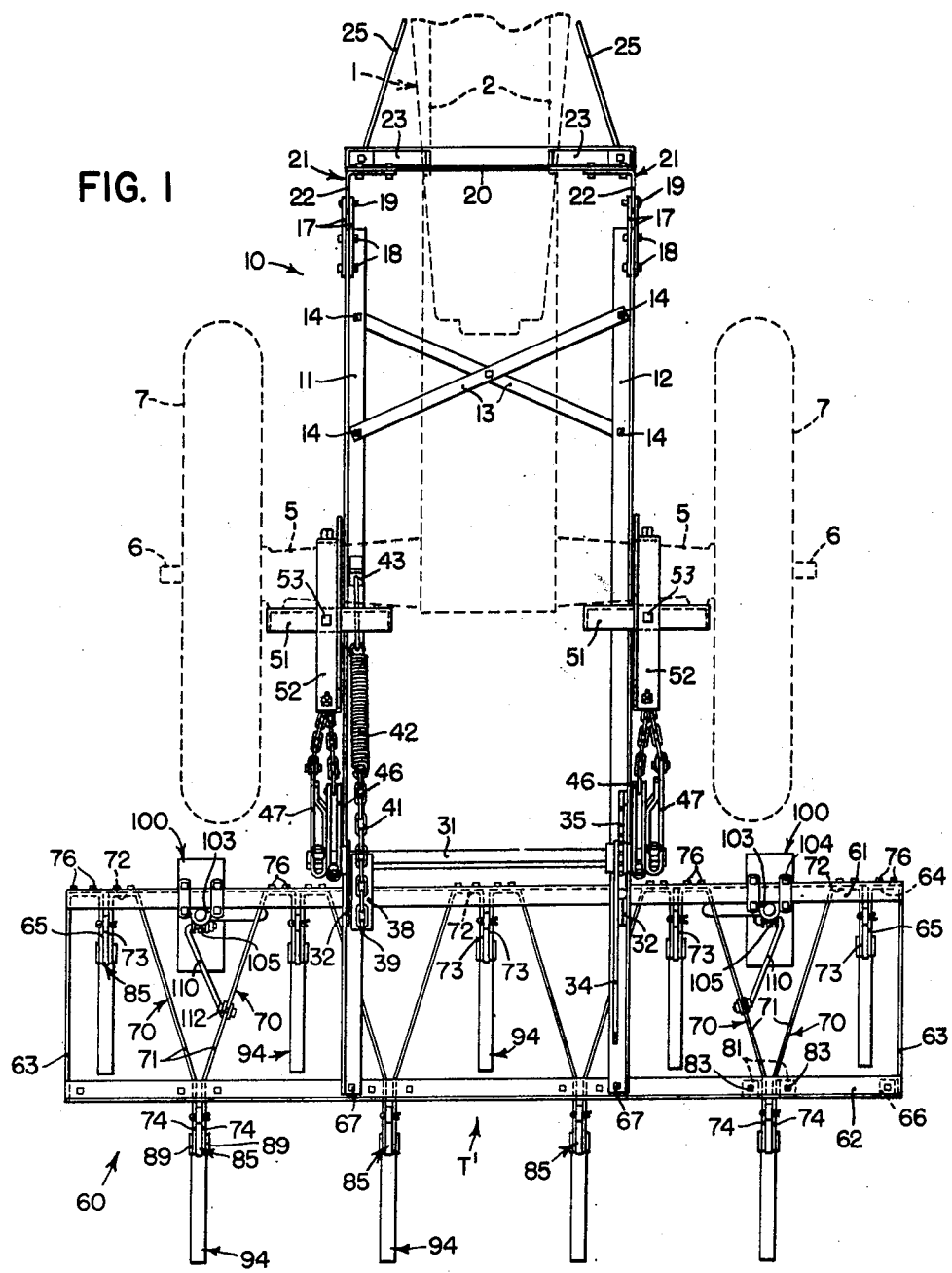
FIG. 1
INVENTORS
WILLIAM A. HYLAND
ATTORNEYS Feb. 28, 1950     W. A. HYLAND     2,498,887
CULTIVATOR
Filed Aug. 23, 1944     2 Sheets-Sheet 2
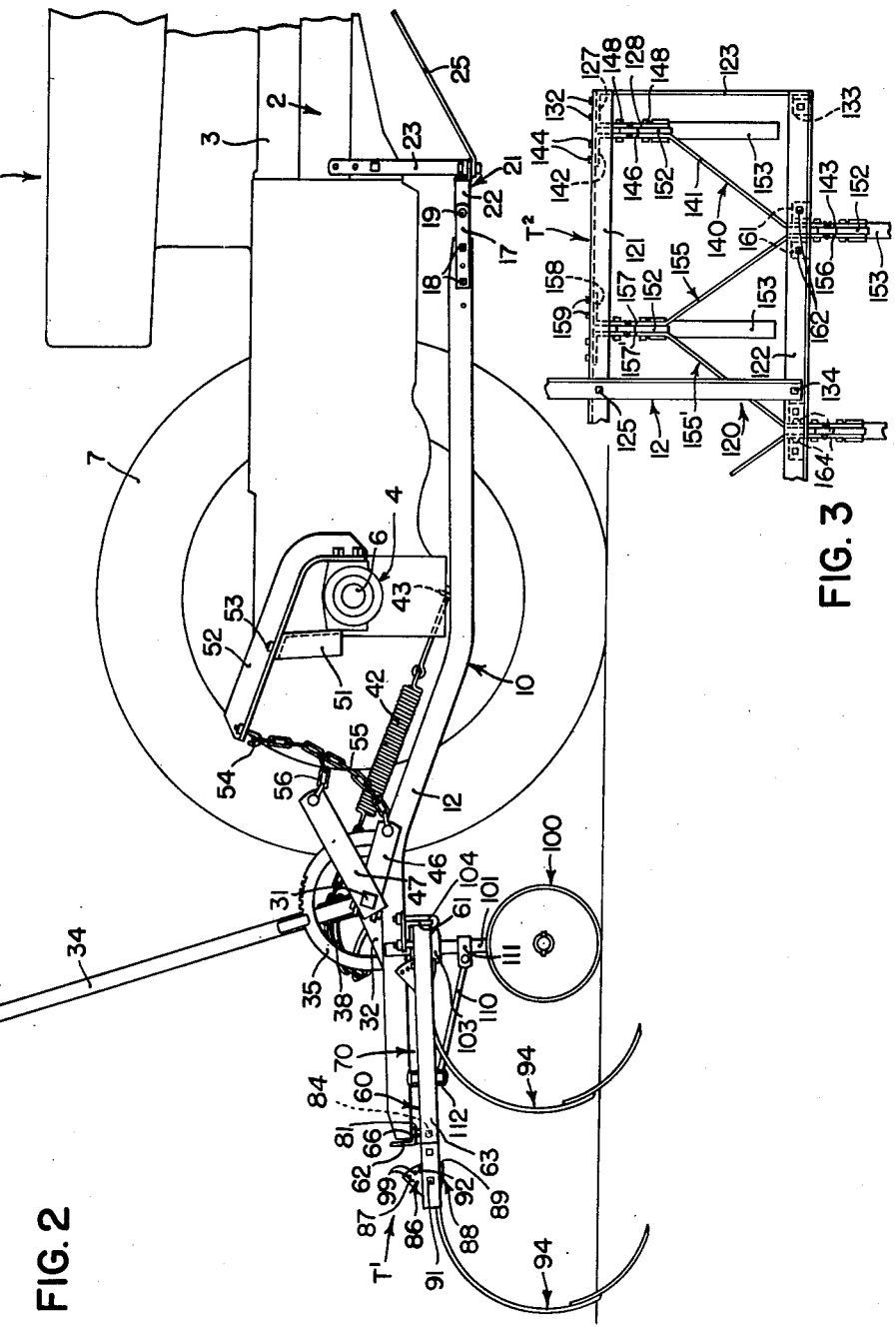
INVENTORS
WILLIAM A. HYLAND
ATTORNEYS Patented Feb. 28, 1950

2,498,887

UNITED STATES PATENT OFFICE 2,498,887

CULTIVATOR

William A. Hyland, Horicon, Wis., assignor to John Deere Van Brunt Company, a corporation of Wisconsin Application August 23, 1944, Serial No. 550,789

6 Claims. (Cl. 97—164)

1

This application is a continuation-in-part of the co-pending application, Serial No. 501,882, filed by Ernst E. Schnell and myself September 10, 1943, for Cultivator lift mechanism, now Patent No. 2,429,552, issued October 21, 1947.

The present invention relates generally to agricultural machines and more particularly to cultivating machines of the type that is adapted to be mounted directly on a propelling tractor.

The object and general nature of the present invention is the provision of a field cultivator or similar implement having extended cross braces carrying the tools or teeth, whereby a rigid integral implement is provided which is sturdy yet simple and inexpensive to manufacture and assemble. These and other objects and advantages of the present invention will be apparent to those skilled in the art after a consideration of the following detailed description, taken in conjunction with the accompanying drawings.

In the drawings:

Figure 1 is a plan view of an integral cultivator in which the principles of the present invention have been incorporated.

Figure 2 is a side view of the implement shown in Figure 1.

Figure 3 is a fragmentary view showing a modified form of the present invention.

Referring now more particularly to Figures 1 and 2, the tractor is indicated in its entirety by the reference numeral 1 and is of conventional construction, including front steering wheels (not shown), frame means 2, a tractor motor 3 and a rear axle 4 which includes laterally outwardly directed quill sections 5 in which axle shafts 6 are journaled for rotation. Rear traction wheels 7 are fixed to the axle shafts 6. In the tractor 1 shown in Figure 1, no power lift is provided.

An implement frame is indicated in its entirety by the reference numeral 10 and includes a pair of generally longitudinally extending laterally spaced frame bars 11 and 12 connected together at their front ends by a pair of cross braces 13 which are bolted, as at 14, or otherwise secured at their ends to the horizontal flanges of the angles forming the frame bars 11 and 12. Secured to the forward end of each of the frame bars 11 and 12 is a pair of connecting straps 17 which are provided with a plurality of openings to receive bolt means 18 by which the connecting straps may be secured to the frame bars in different positions. The front ends of the straps of each pair are apertured to receive a connecting pin 19. The other frame bar is also provided with a similar pair of connecting straps apertured

2 to receive a connecting pin, and as best shown in Figure 1, the connecting pins 19 serve to pivotally connect the implement frame 10 with an attaching strap 21 which is provided with rearwardly bent apertured ears 22 to receive the pins. The attaching strap member 21 is bolted to a draw angle 20 connected by hanger elements 23 to the frame 2 of the tractor. Also, hitch members 25 are connected at their rear ends to the end portions of the draw angle 20 and at their forward ends to the front portion of the tractor frame. The front braces 13 serve to maintain the frame bars 11 and 12 in laterally spaced relation and the rear ends of the frame bars 11 and 12 are maintained in laterally spaced relation by the tool unit that is attached thereto, as will be explained in detail later.

A transverse rockshaft 31 is journaled in a pair of brackets 32 fixed, respectively, to the frame bars 11 and 12. A hand lever 34 is clamped to the rockshaft 31 and operates adjacent a sector 35 which is fixed to the right hand frame bar 12. At the other side of the tool frame the rockshaft 31 carries a cam member 38 clamped to the rockshaft adjacent the left hand bracket 32. The cam member is provided with a slot 39 to receive a link of a chain 41 which at its other end is connected to a spring 42 that, in turn, is anchored, as at 43, to a lug carried by the forward portion of the frame bar 11. The cam 38 is shaped so that the spring exerts a substantially constant force tending to turn the rockshaft in a clockwise direction (Figure 2).

The rockshaft 31 extends laterally outwardly beyond the bracket at each side of the frame 10, and secured to each end of the rockshaft 31 is a pair of arms 46 and 47. A bracket support 51 is fixed to the rear side of each of the tractor rear axle extensions 5, and a bracket 52 that is substantially L-shaped is fixed at one end to the forward side of each of the quills 5 and at the other end extends upwardly over and then rearwardly of the associated bracket support 51, being bolted to the latter as indicated at 53. The rear end of each of the brackets 52 is apertured to receive a hook bolt 54, and at each side of the tractor, a pair of chains 55 and 56 are hooked over the bolt 54 and extend downwardly, the chain 55 being connected at its lower end with the arm 46 at that side of the tractor while the other chain 56 is connected with the other arm 47.

As best shown in Figure 2, the arms 46 and 47 and the associated chains 55 and 56 are so arranged that when the hand lever 34 is first swung forwardly from its rearmost position, the ratio of the amount of movement of the hand lever to the corresponding amount of movement upwardly of the rear portion of the frame 10 is relatively high, thus providing an easy lift when raising the tools out of the ground. It is to be noted at this point, however, that when the hand lever 34 is raised from its rearmost position to an intermediate position, at the relatively slow rate resulting from the high ratio just mentioned, the teeth are raised to or slightly above the ground surface. Due to the effort required to disengage the teeth from the ground, especially from, for example, a deep operating position, the above-mentioned high lifting ratio is particularly desirable. This is secured by the fact that the arms 46 are shorter than the arms 47 and to the fact that the arms 47 are displaced angularly in a counterclockwise direction from the arms 46 which, taken together with the fact that when the chains 55 are taut, as is necessary to initially lift the tools from the ground, the other chains 56 are slack. However, at about the point where the tools emerge from the ground, the longer arms 47 have been angularly displaced an amount sufficient to take the slack out of the chains 56, and following this the continued forward movement of the hand lever 34 now raises the frame 10 at a much greater rate, or, in other words, the ratio of movement of hand lever to the corresponding amount of movement of the frame is now appreciably decreased, so that the chains 55 go slack and the chains 56 support the frame and form the point of reaction for the arms 47 whereby the desired rapid lift after the tools emerge from the ground is secured.

The present invention is especially concerned with the particular frame arrangement of the tool unit T¹. The tool unit T¹ preferably takes the form of a field cultivator unit and is especially constructed to be mounted on the rear ends of the longitudinal frame bars 11 and 12. The tool frame of the unit T¹ is indicated in its entirety by the reference numeral 60 and comprises a pair of transverse angles 61 and 62 connected together at their ends by end bars 63. Preferably, the forward transverse angle 61 is disposed so as to be adapted to be bolted in position underneath the rear end portions of the frame bars 11 and 12, as by bolts which pass through the horizontal flange of the angle 61 and the horizontal flanges of the main frame bars 11 and 12, which also are angles in the preferred construction. Each of the side bars 63 has its forward end formed with a lateral section 64 and a rearwardly directed section 65, the lateral section being bolted to the vertical flange of the front transverse angle 61. At its rear end each of the end bars 63 carries a clip 66, and the rear transverse angle 62 rests upon and has its horizontal flange bolted or riveted to these clips 66, thereby disposing the angle 62 in a horizontal plane above the horizontal plane of the front angle 61. This disposes the rear angle 62 in a position to lie in the horizontal plane of the main frame angles 11 and 12, particularly the rear portions thereof, and the rear ends of the main frame angles 11 and 12 have their horizontal flanges apertured to receive bolts 67 which pass through apertures in the horizontal flange of the rear angle 62. Thus, the angles 61 and 62 of the tool unit frame serve to reenforce the main frame angles 11 and 12 and maintain them in the proper laterally spaced position.

The tool frame 60 also includes transverse reenforcing cross bars which, according to the principles of the present invention, serve also as attaching bars for the cultivator teeth. Preferably, these reenforcing bars are of identical construction and each is indicated by the reference numeral 70. Each of the reenforcing bars 70 includes a generally diagonal section 71, a forward lateral section 72 and a rearwardly directed straight section 73 at its front end, the rear end of the bar 70 including a straight rearwardly directed section 74. The vertical flange of the forward transverse angle 61 is provided with a plurality of apertures so as to receive bolt means 76, generally arranged in pairs, which fasten the lateral sections 72 of the several reenforcing bars 70 in position. The spacing of these bars is such that when the laterally outer bar is in position its rearwardly directed section 73 is spaced laterally inwardly a short distance from the adjacent straight section 65 of the end bar 63, the next laterally inward bar 70 being turned over and secured in place by the bolts 76 associated therewith so that its rear section 74 is disposed adjacent but slightly spaced from the straight section 74 of the first bar 70. Preferably, the spacing between the sections 74 is substantially the same as the spacing between the section 73 and the adjacent end bar section 65. The rear ends of the bars 70 are thus arranged in pairs, and these paired sections pass underneath the rear transverse angle 62 and are secured to the horizontal flange thereof by a pair of clips 81 which are bolted, as at 83, to the horizontal flange of the angle 62 and at 84 to the rear end portions of the bars 70.

As to the other laterally inward bars 70 the arrangement in pairs is substantially as just described and hence further description is believed to be unnecessary except to state that, as to the laterally inward bars 70, the two rearwardly directed sections 73 of adjacent bars are fixed to the front angle 61 in spaced apart relation corresponding to the spacing between the rear end sections 74 of the other bars and to the spacing between the sections 73 and 65, as mentioned above.

Between each pair of these spaced apart sections 73, 65; 73, 73 and 74, 74 a suitable tool support is disposed. Since as mentioned above the spacing between these pairs of sections are the same, the associated tool supports may be identical, and hence a description of one of them will suffice. Each tool support is indicated in its entirety by the reference numeral 85 and comprises a generally T-shaped casting 86 having a vertically disposed apertured web 87 and a lower notched section 88 which includes laterally arranged apertured ears 89. The vertical flange 87 of the casting 86 is formed to fit in between the associated sections of the reenforcing bars 70, and these sections are apertured to receive a pivot bolt 91 which mounts the associated tool support in position. The latter is capable of being angularly adjusted by means of a pin, such as a cotter key 92, passed through one of the plurality of openings in the flange or web 87 and resting on top of the associated reenforcing bar sections. A cultivator spring tooth of conventional construction, indicated by the reference numeral 94, is seated in the notch in the section 88 and is held in place by a clip and a pair of bolts which pass through the clip and the apertured ears 89. Tightening the bolts serves to clamp the associated tooth 94 in position, and by placing the pin 92 in one or the other of the several openings, indicated at 99 in the tool support web 87, the position of the tooth may be adjusted so as to provide for shallow, medium, or deep operation, as desired. The position of each tooth 94 may also be adjusted by securing the same in different positions relative to the supporting casting 86.

If desired, the tool unit T¹ may be provided with a pair of gauge wheels, indicated by the reference numeral 100. Preferably, each gauge wheel 100 is mounted for rotation on the lower end of a gauge wheel shank 101, the upper end of which is received for vertical adjustment in a bracket 103 held to the front angle 61 by a pair of U-bolts 104. A pin or bolt 105 carried by the bracket 103 is adapted to be disposed in one or the other of a plurality of openings formed in the rear side of the gauge wheel shank 101 at the upper end thereof. The shank 101 is held against displacement by a brace rod 110 which is secured at its front end to the shank 101 by a clamp 111 and at its rearward end is connected by a clamp 112 to the diagonal portion of the adjacent reenforcing bar 70.

A somewhat simplified form of implement frame is shown in Figure 3. Referring now to this figure, the implement having the modified form of frame is indicated by the reference character T² and the frame is indicated by the reference numeral 120 and comprises a pair of laterally extending transverse angles 121 and 122 spaced apart in a fore and aft direction and connected together at their ends by end bars 123. Like the frame bar 61 described above, the front frame angle 121 is disposed so as to be adapted to be bolted in position underneath the rear end portions of the draft frame bars 11 and 12, as by bolts 125 which pass through the horizontal flange of the front angle 121 and the horizontal flanges of the main frame bars 11 and 12, which also are angles in the preferred construction. Each of the side bars 123 has its forward end formed, like the side bars 63 described above, with a lateral section 127 which terminates in a rearwardly directed section 128 disposed generally parallel but laterally inwardly of the main body of the end bar 123. The lateral section 127 is bolted to the vertical flange of the front transverse angle 121, as by one or more bolts 132. At its rear end each of the end bars 123 is connected by a clip 133 to the lower side of the adjacent end of the frame bar 122, thus disposing the latter frame bar in a horizontal plane above the horizontal plane of the front angle 121. This disposes the rear angle 122 in a position to lie in the horizontal plane of the main frame angles 11 and 12, particularly the rear portions thereof, and the rear ends of the main frame angles 11 and 12 have their horizontal flanges apertured to receive bolts 134 which pass through apertures in the horizontal flange of the rear frame angle 122. Thus, the angles 121 and 122 of the tool unit frame serve to reenforce the main frame angles 11 and 12 and maintain them in the proper laterally spaced position.

The tool frame 120 also includes reenforcing bars which, according to the principles of the present invention, serve also as attaching bars for the cultivator teeth. Preferably, these reenforcing bars are of identical construction and each is indicated by the reference numeral 140. Each of the bars 140 includes a generally diagonal section 141, a forward laterally directed section 142, and a rearwardly directed section 143. The vertical flange of the forward transverse angle 121 is provided with a plurality of apertures so as to receive bolt means 144 which fasten the laterally directed sections 142 of the several reenforcing bars 140 in position. The laterally outer bar 140 is spaced from the end bar 123 such a distance that the forward flat section 146 is parallel to but spaced a distance from the rearwardly directed flat section 128 of the end bar 123. Bolt means 148 passes through apertures in these parallel portions of the frame bars and also pass through the apertured flange of a tool-receiving member 152, which may be identical with the tool support 85 described above. A cultivator tooth 153 is secured in the usual way to the tool support 152. The next laterally inwardly positioned reenforcing bar is indicated by the reference numeral 155 and is identical with the reenforcing bar 140 but during assembly is turned over so that the rearwardly extended section 156 is spaced from but parallel to the portion 143 of the reenforcing bar 140, and likewise the front flat section 157 is parallel to and spaced laterally of the corresponding flat section 157' of the next laterally inwardly directed reenforcing brace 155'. Also, the forward laterally directed section 158 is disposed against the vertical flange of the front angle 121 and is fastened in place by bolts 159. The rear ends of the bars 140, 155 are thus arranged in pairs, and these paired sections 143, 156 pass underneath the rear transverse frame angle 122 and are secured to the horizontal flange of the latter by a pair of clips 161 which are bolted, as at 162, to the horizontal flange of the rear angle 122 and at 164 to the rear end portions of the bars 140, 155.

Between the rear ends 143, 156 of the paired braces is disposed a tool support 152 and associated tool, and likewise, a tool support is disposed between the forward spaced apart portions 157, 157,' being bolted in place in the same way as the tool support 152 first described above. It will thus be seen that the frame construction just described is somewhat simpler than the frame construction shown in Figures 1 and 2 but that the two frame arrangements are substantially identical in that the reenforcing bars, which are identical, may be reversed and arranged not only to reenforce the fore and aft spaced front and rear frame bars but also form supports to receive the associated tools in a simple and sturdy manner. The tools 153 are adjustable in the supports 152 in the same manner as the tools shown in Figures 1 and 2 and described above. Also, gauge wheels may be provided for the implement T², and the gauge wheels may be constructed like that shown in Figure 1. Therefore, further description is believed to be unnecessary.

While I have shown and described above the preferred structure in which the principles of the present invention have been corporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A cultivator comprising a pair of transverse fore and aft spaced bars, a plurality of pairs of cross bars, means fixing the front and rear end portions of said cross bars to said transverse bars, respectively, each of said cross bars including a rearwardly extending section at its rear end extending rearwardly of the rear transverse bar and a section at the front end extending generally in a fore and aft direction rearwardly of the front transverse bar, said cross bars being arranged so that the front and rear sections of one bar are disposed adjacent but spaced from the corresponding sections of the adjacent cross bars, front and rear tool supporting means fixed in position between adjacent sections, both front and rear, of said cross bars, and tools carried by said tool supporting means.

2. An implement frame comprising front and rear frame bars, end bars therefor, each end bar being secured at its rear end to the adjacent end of the rear frame bar and having at its front end a laterally directed section which terminates in a flat rearwardly directed straight portion, and a plurality of cross bars connected with said front and rear frame bars between said end bars, said cross bars being arranged in pairs and each having front and rear straight sections and an interconnecting diagonal section, each of the laterally outer cross bars having its front straight section disposed adjacent the rearwardly directed straight section of the associated end bar to form a tool-receiving part and the other cross bars being arranged in pairs with the straight sections thereof in spaced apart relation to form tool receiving parts.

3. In an agricultural implement, an implement frame comprising front and rear frame bars, and a plurality of cross bars connected at their front and rear end portions, respectively, with said front and rear frame bars, each of said cross bars comprising a rearwardly directed section at the rear end thereof disposed rearwardly of the rear frame bar, a front portion including a section parallel to said rear section, a diagonal portion extending between said front and rear bar sections, and means for connecting said cross bars with said front and rear frame bars so that the diagonal portions of said cross bars extend generally laterally respectively in opposite directions and said cross bars being spaced along said front and rear frame bars so that the rearwardly extending and parallel sections of one bar are disposed in substantially closely spaced and parallel relation with respect to the corresponding rearwardly extending and parallel sections of adjacent cross bars, and tool means disposed between and pivotally connected with the parallel sections of each pair of said closely spaced parallel sections.

4. An implement frame comprising a front frame bar, a rear frame bar, a pair of end bars each secured at its rear end to the adjacent end of the rear frame bar, the front end of each of said end bars having a rearwardly directed section, and a plurality of cross bars, each including front and rear parallel sections and an interconnecting diagonal section, each of said cross bars being identical and said cross bars being assembled in pairs with the rear sections disposed adjacent one another and the forward parallel sections of all of said cross bars except the laterally outer cross bars being disposed adjacent the forward sections of the associated cross bars, tool means connected with adjacent sections of said rear sections and with adjacent sections of said forward parallel sections, each of the laterally outer cross bars having its forward section disposed in parallelism with the rearwardly directed section of the associated end bar, tool means connected with the forward sections of said laterally outer cross bars and the adjacent rearwardly directed sections of the associated end bars, and means for fastening said cross bars and said end bars to said front and rear frame bars.

5. An implement frame comprising front and rear frame bars, end bars therefor, each end bar being secured at its rear end to the adjacent end of the rear frame bar and having at its front end a laterally directed section which terminates in a flat rearwardly directed straight portion, and a plurality of cross bars connected with said front and rear frame bars, said cross bars being arranged in pairs and each having front and rear straight sections and an interconnecting diagonal section, said bars being arranged in pairs with the straight sections in spaced apart relation to form tool receiving parts, the forward ends of each of said cross bars having laterally directed portions terminating in rearwardly directed straight sections, said laterally directed portions being secured to the front frame bar and the rearwardly directed straight portion of the laterally outermost cross bar being disposed adjacent the rearwardly directed section of the adjacent end bar to form therewith a tool-receiving part.

6. An implement frame comprising front and rear frame bars, end bars therefor, each end bar being secured at its rear end to the adjacent end of the rear frame bar and having at its front end a laterally directed section which terminates in a flat rearwardly directed straight portion, and a plurality of cross bars connected with said front and rear frame bars, said cross bars being arranged in pairs and each having front and rear straight sections and an interconnecting diagonal section, said bars being arranged in pairs with the straight sections in spaced apart relation to form tool receiving parts, each of said cross bars having a laterally directed section at the front end of the forward straight section thereof, and means cooperating with said laterally directed front sections of the cross bars for connecting the latter to the front frame bar.

WILLIAM A. HYLAND.

REFERENCES CITED

The following references are of record in the file of this patent:

UNITED STATES PATENTS

| Number | Name | Date |
| --- | --- | --- |
| 659,608 | McCorkell et al. | Oct. 9, 1900 |
| 792,541 | McEachern | June 13, 1905 |
| 794,361 | Lambson | July 11, 1905 |
| 1,017,465 | Rampley | Feb. 13, 1912 |
| 1,234,352 | Lane | July 24, 1917 |
| 1,405,030 | Stephens | Jan. 31, 1922 |
| 1,424,552 | Bronson | Aug. 1, 1922 |
| 1,573,034 | Black | Feb. 16, 1926 |
| 1,701,572 | Koritz | Feb. 12, 1929 |
| 1,702,196 | Cole | Feb. 12, 1929 |
| 1,749,974 | Gallagher | Mar. 11, 1930 |
| 1,846,975 | McLeod et al. | Feb. 23, 1932 |
| 1,982,862 | Erdman | Dec. 4, 1934 |
| 2,230,850 | Sommerfield | Feb. 4, 1941 |

FOREIGN PATENTS

| Number | Country | Date |
| --- | --- | --- |
| 498 | Great Britain | A. D. 1874 |
| 533,056 | France | Nov. 29, 1921 |